United States Patent
Hart et al.

(10) Patent No.: US 8,192,321 B2
(45) Date of Patent: Jun. 5, 2012

(54) EIGHT SPEED AUTOMATIC TRANSMISSION

(75) Inventors: James M. Hart, Belleville, MI (US); Andrew W. Phillips, Rochester, MI (US); Scott H. Wittkopp, Ypsilanti, MI (US); Clinton E. Carey, Highland, MI (US); Madhusudan Raghavan, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/044,014

(22) Filed: Mar. 9, 2011

(65) Prior Publication Data

US 2011/0160018 A1    Jun. 30, 2011

Related U.S. Application Data

(63) Continuation of application No. 12/049,463, filed on Mar. 17, 2008, now Pat. No. 7,927,248.

(51) Int. Cl.
*F16H 3/44*    (2006.01)

(52) U.S. Cl. .................. 475/282; 475/288; 475/290

(58) Field of Classification Search ............... 475/21, 475/275–291, 296, 330
See application file for complete search history.

(56) References Cited

U.S. PATENT DOCUMENTS

| | | | |
|---|---|---|---|
| 6,176,803 B1 | 1/2001 | Meyer et al. | |
| 6,558,287 B2 | 5/2003 | Hayabuchi et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 7,101,305 B2 | 9/2006 | Tabata et al. | |
| 7,163,484 B2 | 1/2007 | Klemen | |
| 7,749,129 B2 * | 7/2010 | Wittkopp et al. | 475/296 |
| 2005/0090362 A1 | 4/2005 | Abe et al. | |
| 2006/0270513 A1 | 11/2006 | Klemen | |
| 2006/0270516 A1 | 11/2006 | Klemen | |
| 2008/0248915 A1 | 10/2008 | Hart et al. | |
| 2009/0017975 A1 * | 1/2009 | Hart et al. | 475/276 |
| 2009/0239699 A1 * | 9/2009 | Baldwin | 475/276 |
| 2010/0203997 A1 * | 8/2010 | Baldwin | 475/154 |

* cited by examiner

*Primary Examiner* — Roger Pang

(57) ABSTRACT

An automatic transmission includes an input member, an output member, four planetary gear sets, a plurality of coupling members and a plurality of torque transmitting devices. Each of the planetary gear sets includes first, second and third members. The torque transmitting devices may be either clutches or brakes.

19 Claims, 3 Drawing Sheets

| GEAR STATE | GEAR RATIO | RATIO STEP | TORQUE TRANSMITTING DEVICES ||||| 
|---|---|---|---|---|---|---|---|
| | | | 32 | 34 | 26 | 28 | 30 |
| REV | -3.457 | | X | | | X | X |
| N | | -0.86 | | | | | |
| 1ST | 4.000 | | X | | X | X | |
| 2ND | 2.670 | 1.50 | X | X | | X | |
| 3RD | 1.739 | 1.54 | | X | X | X | |
| 4TH | 1.340 | 1.30 | | X | | X | X |
| 5TH | 1.000 | 1.34 | | | X | X | X |
| 6TH | 0.771 | 1.30 | | X | X | | X |
| 7TH | 0.656 | 1.18 | X | | X | | X |
| 8TH | 0.515 | 1.27 | X | X | | | X |

X = ON - ENGAGED CARRYING TORQUE

| GEAR STATE | GEAR RATIO | RATIO STEP | TORQUE TRANSMITTING DEVICES | | | | |
|---|---|---|---|---|---|---|---|
| | | | 134 | 132 | 126 | 130 | 128 |
| REV | -3.000 | | | X | | X | X |
| N | | -0.75 | | | | | |
| 1ST | 4.000 | | | X | X | | X |
| 2ND | 2.600 | 1.54 | X | X | | | X |
| 3RD | 1.667 | 1.56 | X | | X | | X |
| 4TH | 1.308 | 1.27 | X | | | X | X |
| 5TH | 1.000 | 1.31 | | | X | X | X |
| 6TH | 0.769 | 1.30 | X | | X | X | |
| 7TH | 0.640 | 1.20 | | X | X | X | |
| 8TH | 0.500 | 1.28 | X | X | | X | |

X = ON - ENGAGED CARRYING TORQUE

EIGHT SPEED AUTOMATIC TRANSMISSION

CROSS-REFERENCE TO RELATED APPLICATIONS

This application is a continuation of Ser. No. 12/049,463 filed on Mar. 17, 2008 which claims the benefit of U.S. Provisional Application No. 60/909,778 filed on Apr. 3, 2007. The disclosure of the above application is incorporated herein by reference.

FIELD

The invention relates generally to a multiple speed automatic transmission having a plurality of planetary gear sets and a plurality of torque transmitting devices and more particularly to an eight speed automatic transmission having four planetary gear sets and a plurality of torque transmitting devices.

BACKGROUND

The statements in this section merely provide background information related to the present disclosure and may or may not constitute prior art.

A typical multiple speed automatic transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current automatic transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed automatic transmission.

SUMMARY

An automatic transmission is provided that includes an input member, an output member, four planetary gear sets, a plurality of coupling members and a plurality of torque transmitting devices. Each of the planetary gear sets includes first, second and third members. The torque transmitting devices may be either clutches or brakes.

One embodiment of the transmission includes an input member, an output member, and first, second, third and fourth planetary gear sets each having first, second and third members. A first interconnecting member continuously interconnects the first member of the first planetary gear set with the first member of the second planetary gear set and the second member of the third planetary gear set. A second interconnecting member continuously interconnects the second member of the first planetary gear set with the third member of the second planetary gear set. A third interconnecting member continuously interconnects the second member of the second planetary gear set with the third member of the fourth planetary gear set. Five torque transmitting devices are selectively engageable to interconnect one of the first members, second members, and third members with at least one of the first members, second members, third members, and a stationary member. The torque transmitting devices are selectively engageable in combinations of at least three to establish at least eight forward speed ratios and at least one reverse speed ratio between the input member and the output member.

In one aspect of the present invention, a first of the five torque transmitting devices is selectively engageable to interconnect at least one of the second member of the fourth planetary gear set and the input member with at least one of the first member of the second planetary gear set, the first member of the first planetary gear set, and the second member of the third planetary gear set.

In another aspect of the present invention, a second of the five torque transmitting devices is selectively engageable to interconnect at least one of the third member of the second planetary gear set and the second member of the first planetary gear set with at least one of the third member of the third planetary gear set and the output member.

In yet another aspect of the present invention, a third of the five torque transmitting devices is selectively engageable to interconnect the first member of the fourth planetary gear set with the first member of the third planetary gear set.

In yet another aspect of the present invention, a fourth of the five torque transmitting devices is selectively engageable to interconnect the third member of the first planetary gear with the stationary member.

In yet another aspect of the present invention, a fifth of the five torque transmitting devices is selectively engageable to interconnect the first member of the fourth planetary gear set with the stationary member.

In yet another aspect of the present invention, a second of the five torque transmitting devices is selectively engageable to interconnect the first member of the fourth planetary gear set with the first member of the third planetary gear set.

In yet another aspect of the present invention, a third of the five torque transmitting devices is selectively engageable to interconnect at least one of the third member of the second planetary gear set and the second member of the first planetary gear set with the first member of the third planetary gear set.

In yet another aspect of the present invention, the first members are sun gears, the second members are carrier members, and the third members are ring gears.

In yet another aspect of the present invention, the first member of the first planetary gear set is a carrier member, the second member of the first planetary gear set is a ring gear, the third member of the first planetary gear set is a sun gear, the first member of the second planetary gear set is a ring gear, the second member of the second planetary gear set is a sun gear, the third member of the second planetary gear set is a carrier member, the first member of the third planetary gear set is a ring gear, the second member of the third planetary gear set is a sun gear, the third member of the third planetary gear set is a carrier member, the first member of the fourth planetary gear set is a ring gear, the second member of the fourth planetary gear set is a carrier member, and the third member of the fourth planetary gear set is a sun gear.

In yet another aspect of the present invention, the input member is continuously interconnected with the second member of the fourth planetary gear set and the output member is continuously interconnected with the third member of the third planetary gear set.

Another embodiment of the transmission of the present invention includes an input member, an output member, first, second, third and fourth planetary gear sets each having a sun gear, a carrier member, and a ring gear, wherein the input member is continuously interconnected with the carrier member of the fourth planetary gear set and the output member is continuously interconnected with the ring gear of the third planetary gear set. A first interconnecting member continuously interconnects the sun gear of the first planetary gear set with the sun gear of the second planetary gear set and the carrier member of the third planetary gear set. A second interconnecting member continuously interconnects the carrier member of the first planetary gear set with the ring gear of the second planetary gear set. A third interconnecting member continuously interconnects the carrier member of the second planetary gear set with the ring gear of the fourth planetary gear set. A first torque transmitting device is selectively engageable to interconnect at least one of the carrier member of the fourth planetary gear set and the input member with at least one of the sun gear of the second planetary gear set, the sun gear of the first planetary gear set, and the carrier member of the third planetary gear set. A second torque transmitting device is selectively engageable to interconnect at least one of the ring gear of the second planetary gear set and the carrier member of the first planetary gear set with at least one of the ring gear of the third planetary gear set and the output member. A third torque transmitting device is selectively engageable to interconnect the sun gear of the fourth planetary gear set with the sun gear of the third planetary gear set. A fourth torque transmitting device is selectively engageable to interconnect the ring gear of the first planetary gear with a stationary member. A fifth torque transmitting device is selectively engageable to interconnect the sun gear of the fourth planetary gear set with the stationary member. The torque transmitting devices are selectively engageable in combinations of at least three to establish at least eight forward speed ratios and at least one reverse speed ratio between the input member and the output member.

Yet another embodiment of the transmission of the present invention includes an input member, an output member, first, second, third and fourth planetary gear sets each having a sun gear, a carrier member, and a ring gear, wherein the input member is continuously interconnected with the carrier member of the fourth planetary gear set and the output member is continuously interconnected with the carrier member of the third planetary gear set. A first interconnecting member continuously interconnects the carrier member of the first planetary gear set with the ring gear of the second planetary gear set and the sun gear of the third planetary gear set. A second interconnecting member continuously interconnects the ring gear of the first planetary gear set with the carrier member of the second planetary gear set. A third interconnecting member continuously interconnects the sun gear of the second planetary gear set with the sun gear of the fourth planetary gear set. A first torque transmitting device is selectively engageable to interconnect at least one of the carrier member of the fourth planetary gear set and the input member with at least one of the ring gear of the second planetary gear set, the carrier member of the first planetary gear set, and the sun gear of the third planetary gear set. A second torque transmitting device is selectively engageable to interconnect the ring gear of the fourth planetary gear set with the ring gear of the third planetary gear set. A third torque transmitting device is selectively engageable to interconnect at least one of the carrier member of the second planetary gear set and the ring gear of the first planetary gear set with the ring gear of the third planetary gear set. A fourth torque transmitting device is selectively engageable to interconnect the sun gear of the first planetary gear with a stationary member. A fifth torque transmitting device is selectively engageable to interconnect the ring gear of the fourth planetary gear set with the stationary member. The torque transmitting devices are selectively engageable in combinations of at least three to establish at least eight forward speed ratios and at least one reverse speed ratio between the input member and the output member.

Further aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. These permanent mechanical connections relate the transmission embodiments. More specifically, a first component or element of a first planetary gear set is permanently coupled to a first component or element of a second planetary gear set. A second component or element of the first planetary gear set is permanently coupled to a second component or element of the second planetary gear set and to a second component or element of a third planetary gear set. A third component or element of the second planetary gear set is permanently coupled to a third component or element of a fourth planetary gear set.

Figure 1:
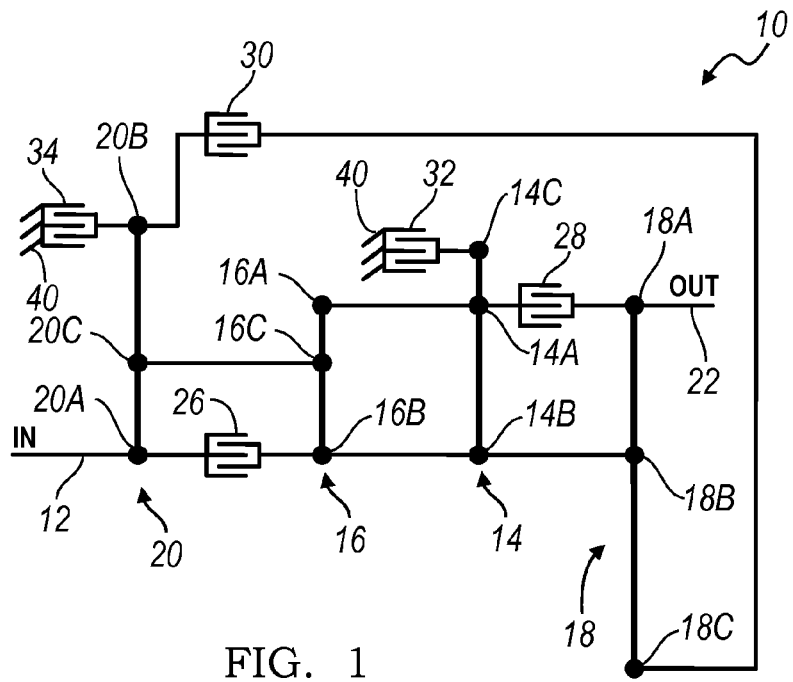
FIG. 1 is a lever diagram of an embodiment of an eight speed automatic transmission according to the present invention.

Referring now to FIG. 1, a first embodiment of an eight speed automatic transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear member, one for the planet gear carrier, and one for the ring gear member. The relative length between the nodes of each lever can be used to represent the ring-to-sun ratio of each respective gearset. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. If the device is a brake, one set of the fingers is grounded. Further explanation of the format, purpose and use of lever diagrams can be found in SAE Paper 810102, which is hereby fully incorporated by reference.

The automatic transmission 10 includes an input shaft 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C, and an output shaft 22. The first node 14A of the first planetary gear set 14 is coupled to the first node 16A of the second planetary gear set 16. The second node 14B of the first planetary gear set 14 is coupled to the second node 16B of the second planetary gear set 16. The second node 14B of the first planetary gear set 14 is coupled to the second node 18B of the third planetary gear set 18. The third node 16C of the second planetary gear set 16 is coupled to the third node 20C of the fourth planetary gear set 20.

The input shaft 12 is coupled to the first node 20A of the fourth planetary gear set 20. The output shaft 22 is coupled to the first node 18A of the third planetary gear set 18. A first clutch 26 selectively connects the first node 20A of the fourth planetary gear set 20 to the second node 16B of the second planetary gear set 16. A second clutch 28 selectively connects the first node 14A of the first planetary gear set 14 to the first node 18A of the third planetary gear set 18. A third clutch 30 selectively connects the second node 20B of the fourth planetary gear set 20 to the third node 18C of the third planetary gear set 18. A first brake 32 selectively connects the third node 14C of the first planetary gear set 14 to a ground, stationary member, or transmission housing 40. Finally, a second brake 34 selectively connects the second node 20B of the fourth planetary gear set 20 to a ground, stationary member, or transmission housing 40.

Figure 2:
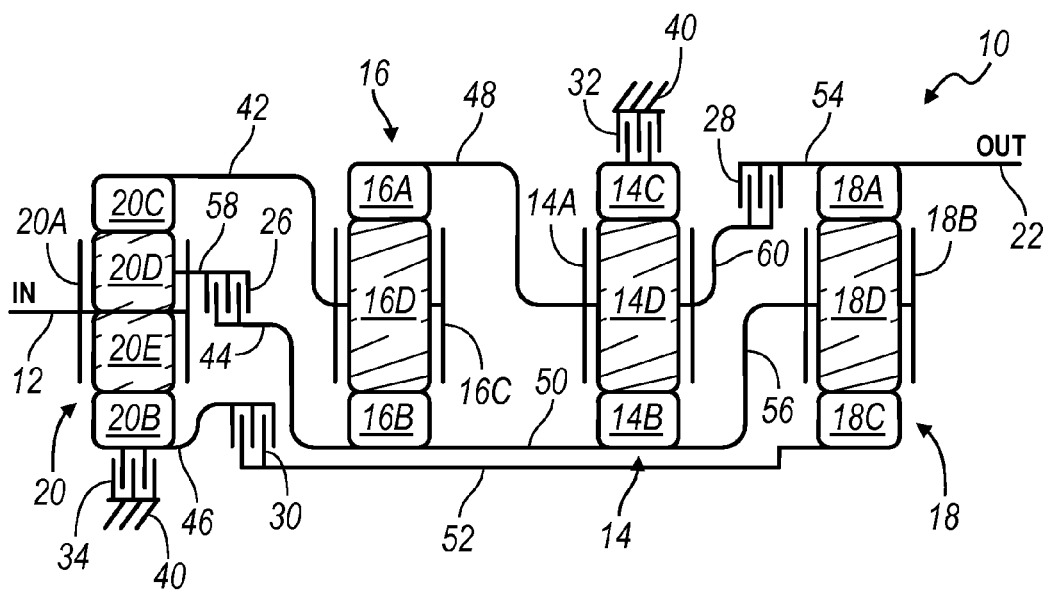
FIG. 2 is a diagrammatic view of an embodiment of the eight speed automatic transmission according to the present invention.

Referring now to FIG. 2, a stick diagram presents a schematic layout of an embodiment of the eight speed transmission 10 according to the present invention. In FIG. 2, the numbering from the lever diagram of FIG. 1 is carried over. The clutches, brakes and couplings are correspondingly presented whereas the nodes of the planetary gear sets now appear as components of planetary gear sets such as sun gear members, ring gear members, planet gears and planet gear carrier members.

For example, the first planetary gear set 14 includes a first sun gear member 14B, a first ring gear member 14C, and a first planet carrier member 14A that includes a plurality of planet gears 14D rotatably disposed thereon. The planet gears 14D are each intermeshed with both the first sun gear member 14B and the first ring gear member 14C. The second planetary gear set 16 includes a second sun gear member 16B, a second ring gear member 16A, and a second planet carrier member 16C that includes a plurality of planet gears 16D rotatably disposed thereon. The planet gears 16D are each intermeshed with both the second sun gear member 16B and the second ring gear member 16A. The third planetary gear set 18 includes a third sun gear member 18C, a third ring gear member 18A, and a third planet carrier member 18B that includes a plurality of planet gears 18D rotatably disposed thereon. The planet gears 18D are each intermeshed with both the third sun gear member 18C and the third ring gear member 18A. The fourth planetary gear set 20 includes a fourth sun gear member 20B, a fourth ring gear member 20C, and a fourth planet carrier member 20A that includes a first plurality of planet gears 20D and a second plurality of planet gears 20E rotatably disposed thereon. The planet gears 20D are each intermeshed with both the planet gears 20E and the fourth ring gear member 20C. The planet gears 20E are each intermeshed with both the planet gears 20D and the fourth sun gear member 20B.

The input shaft 12 is coupled to and directly drives the fourth planetary carrier member 20A. A first shaft or interconnecting member 42 couples the fourth ring gear member 20C to the second planet carrier member 16C. A second shaft or interconnecting member 44 couples the first clutch 26 to the second sun gear member 16B. A third shaft or interconnecting member 46 couples the fourth sun gear member 20B to the third clutch 30. A fourth shaft or interconnecting member 48 couples the second ring gear member 16A to the first planet carrier member 14A. A fifth shaft or interconnecting member 50 couples the second sun gear member 16B to the first sun gear member 14B. A sixth shaft or interconnecting member 52 couples the third clutch 30 to the third sun gear member 18C. A seventh shaft or interconnecting member 54 couples the second clutch 28 to the third ring gear member 18A. An eighth shaft or interconnecting member 56 couples the first sun gear member 14B to the third planet carrier member 18B. A ninth shaft or interconnecting member 58 couples the fourth planet carrier member 20A to the first clutch 26. A tenth shaft or interconnecting member 60 couples the first planet carrier member 14A to the second clutch 28.

The first clutch 26 selectively couples the fourth planet carrier member 20A to the second sun gear member 16B and the first sun gear member 14B. The second clutch 28 selectively couples the first planet carrier member 14A to the third ring gear member 18A. The third clutch 30 selectively couples the fourth sun gear member 20B to the third sun gear member 18C. The first brake 32 selectively couples the first ring gear member 14C to a ground, stationary member, or transmission housing 40. The second brake 34 selectively couples the fourth sun gear member 20B to a ground, stationary member, or transmission housing 40. The output shaft 22 is coupled to and driven by the third ring gear member 18A.

Figures 3, 4:
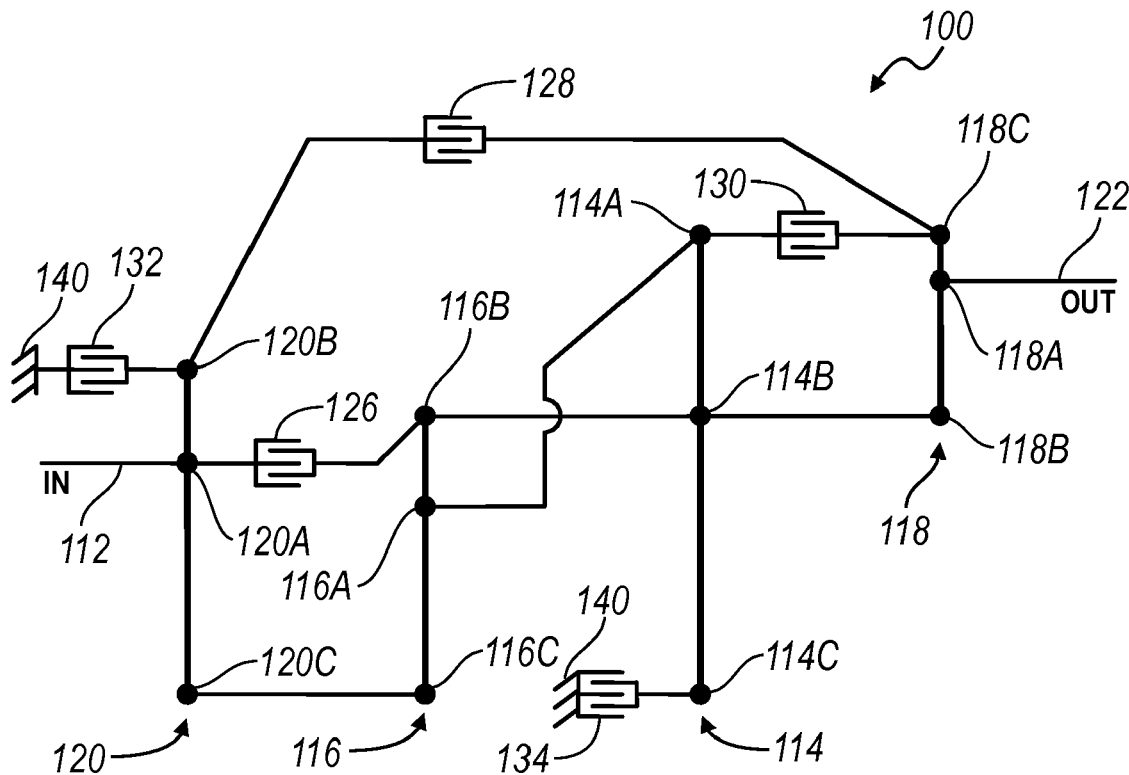
FIG. 3 is a truth table presenting the state of engagement of the various torque transmitting devices in each of the available forward and reverse speeds or gear ratios of the automatic transmission illustrated in FIGS. 1 and 2.
FIG. 4 is a lever diagram of another embodiment of an eight speed automatic transmission according to the present invention.

Referring now to FIGS. 2 and 3, the operation of the eight speed automatic transmission 10 will be described. It will be appreciated that the automatic transmission 10 is capable of transmitting torque from the input shaft 12 to the output shaft 22 in eight forward speed or torque ratios and one reverse speed or torque ratio. Each forward and reverse speed or torque ratio is attained by engagement of one or more of the clutches or brakes as will be explained below. FIG. 3 is a truth table presenting the various combinations of clutches and brakes that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 10.

To establish gear ratios, three torque transmitting devices are engaged for each gear state. The engaged clutches are represented by an "X" in each respective row. For example, to establish reverse gear, the first brake 32, the second clutch 28, and the third clutch 30 are engaged or activated. The first brake 32 couples the first ring gear member 14C to ground. The second clutch 28 couples the first planet carrier member 14A to the third ring gear member 18A. The third clutch 30 couples the fourth sun gear member 20B to the third sun gear member 18C. Likewise, the eight forward ratios are achieved through different combinations of clutch engagement as per FIG. 3.

It will be appreciated that the foregoing explanation of operation and gear states of the eight speed automatic transmission 10 assumes, first of all, that all clutches and brakes not specifically referenced in a given gear state are inactive or disengaged and, second of all, that during gear member shifts, i.e., changes of gear state, between at least adjacent gear states, a clutch or brake engaged or activated in both gear states will remain engaged or activated.

Turning now to FIG. 4, a lever diagram for another embodiment of an eight speed automatic transmission 100 is illustrated. The automatic transmission 100 includes an input shaft 112, a first planetary gear set 114 having three nodes: a first node 114A, a second node 114B and a third node 114C, a second planetary gear set 116 having three nodes: a first node 116A, a second node 116B and a third node 116C, a third planetary gear set 118 having three nodes: a first node 118A, a second node 118B and a third node 118C, a fourth planetary gear set 120 having three nodes: a first node 120A, a second node 120B and a third node 120C, and an output shaft 122.

The input shaft 112 is coupled to the first node 120A of the fourth planetary gear set 120. The output shaft 122 is coupled to the first node 118A of the third planetary gear set 118. The first node 114A of the first planetary gear set 114 is coupled to the first node 116A of the second planetary gear set 116. The second node 114B of the first planetary gear set 114 is coupled to the second node 116B of the second planetary gear set 116. The second node 114B of the first planetary gear set 114 is coupled to the second node 118B of the third planetary gear set 118. The third node 116C of the second planetary gear set 116 is coupled to the third node 120C of the fourth planetary gear set 120.

A first clutch 126 selectively connects the first node 120A of the fourth planetary gear set 120 to the second node 116B of the second planetary gear set 116. A second clutch 128 selectively connects the second node 120B of the fourth planetary gear set 120 to the third node 118C of the third planetary gear set 118. A third clutch 130 selectively connects the first node 114A of the first planetary gear set 114 to the third node 118C of the third planetary gear set 118. A first brake 132 selectively connects the second node 120B of the fourth planetary gear set 120 to a ground, stationary member, or transmission housing 140. Finally, a second brake 134 selectively connects the third node 114C of the first planetary gear set 114 to a ground, stationary member, or transmission housing 140.

Figures 5, 6:
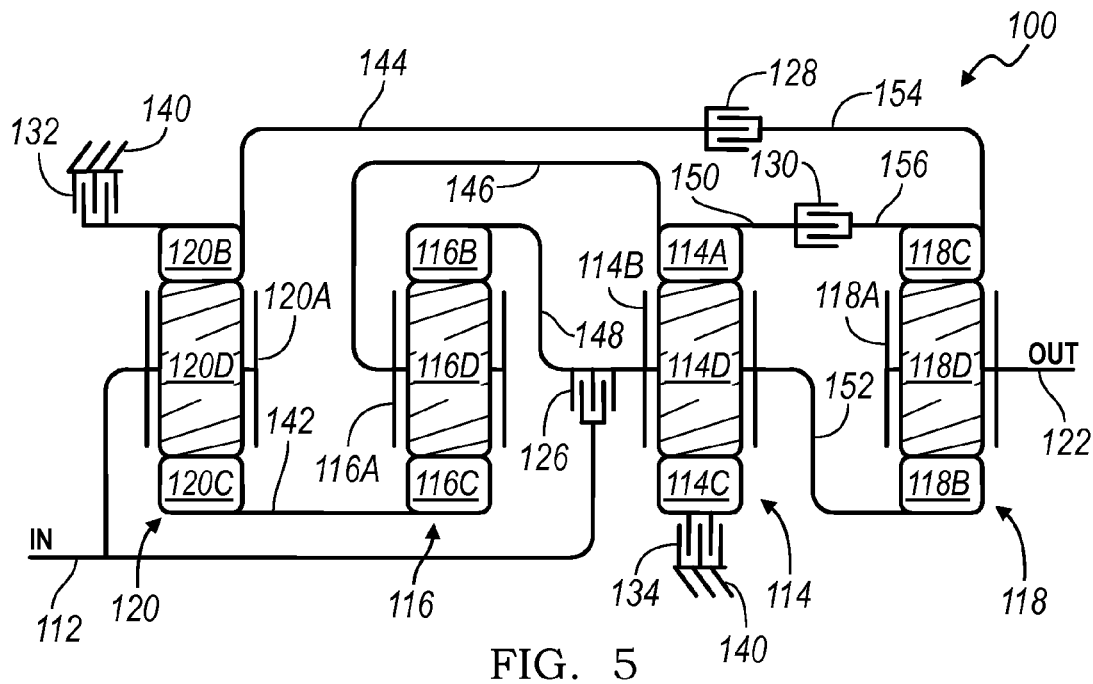
FIG. 5 is a diagrammatic view of another embodiment of the eight speed automatic transmission according to the present invention.
FIG. 6 is a truth table presenting the state of engagement of the various torque transmitting devices in each of the available forward and reverse speeds or gear ratios of the automatic transmission illustrated in FIGS. 4 and 5.

Referring now to FIG. 5, a stick diagram presents a schematic layout of the second embodiment of the eight speed transmission 100 according to the present invention. In FIG. 5, the numbering from the lever diagram of FIG. 4 is carried over. The clutches, brakes and couplings are correspondingly presented whereas the nodes of the planetary gear sets now appear as components of planetary gear sets such as sun gear members, ring gear members, planet gears and planet gear carrier members.

For example, the first planetary gear set 114 includes a first sun gear member 114C, a first ring gear member 114A, and a first planet carrier member 114B that includes a plurality of planet gears 114D rotatably disposed thereon. The planet gears 114D are each intermeshed with both the first sun gear member 114C and the first ring gear member 114A. The second planetary gear set 116 includes a second sun gear member 116C, a second ring gear member 116B, and a second planet carrier member 116A that includes a plurality of planet gears 116D rotatably disposed thereon. The planet gears 116D are each intermeshed with both the second sun gear member 116C and the second ring gear member 116B. The third planetary gear set 118 includes a third sun gear member 118B, a third ring gear member 118C, and a third planet carrier member 118A that includes a plurality of planet gears 118D rotatably disposed thereon. The planet gears 118D are each intermeshed with both the third sun gear member 118B and the third ring gear member 118C. The fourth planetary gear set 120 includes a fourth sun gear member 120C, a fourth ring gear member 120B, and a fourth planet carrier member 120A that includes a plurality of planet gears 120D rotatably disposed thereon. The planet gears 120D are each intermeshed with both the fourth sun gear member 120C and the fourth ring gear member 120B.

The input shaft 112 is coupled to and directly drives the fourth planetary carrier member 120A and the first clutch 126. A first shaft or interconnecting member 142 couples the fourth sun gear member 120C to the second sun gear member 116C. A second shaft or interconnecting member 144 couples the fourth ring gear member 120B to the second clutch 128. A third shaft or interconnecting member 146 couples the second planet carrier member 116A to the first ring gear member 114A. A fourth shaft or interconnecting member 148 couples the second ring gear member 116B to the first planet carrier member 114B. A fifth shaft or interconnecting member 150 couples the first ring gear member 114A to the third clutch 130. A sixth shaft or interconnecting member 152 couples the first planet carrier member 114B to the third sun gear member 118B. A seventh shaft or interconnecting member 154 couples the second clutch 128 to the third ring gear member 118C. An eighth shaft or interconnecting member 156 couples the third clutch 130 to the third ring gear member 118C.

The first clutch 126 selectively couples the fourth planet carrier member 120A and the input shaft 112 to the second ring gear member 116B and the first planet carrier member 114B. The second clutch 128 selectively couples the fourth ring gear member 120B to the third ring gear member 118C. The third clutch 130 selectively couples the first ring gear member 114A to the third ring gear member 118C. The first brake 132 selectively couples the fourth ring gear member 120B to a ground, stationary member, or transmission housing 140. The second brake 134 selectively couples the first sun gear member 114C to a ground, stationary member, or transmission housing 140. The output shaft 122 is coupled to and driven by the third planet carrier member 118A.

Referring now to FIGS. 5 and 6, the operation of the eight speed automatic transmission 100 will be described. It will be appreciated that the automatic transmission 100 is capable of transmitting torque from the input shaft 112 to the output shaft 122 in eight forward speed or torque ratios and one reverse speed or torque ratio. Each forward and reverse speed or torque ratio is attained by engagement of one or more of the clutches or brakes as will be explained below. FIG. 6 is a truth table presenting the various combinations of clutches and brakes that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the automatic transmission 100.

To establish gear ratios, three torque transmitting devices are engaged for each gear state. The engaged elements are represented by an "X" in each respective row. For example, to establish reverse gear, the first brake 132, the second clutch 128, and the third clutch 130 are engaged or activated. The first brake 132 couples the fourth ring gear member 120B to ground. The second clutch 128 couples the fourth ring gear member 120B to the third ring gear member 118C. The third clutch 130 couples the first ring gear member 114A to the third ring gear member 118C. Likewise, the eight forward ratios are achieved through different combinations of clutch engagement as shown in FIG. 6.

It will be appreciated that the foregoing explanation of operation and gear states of the eight speed automatic transmission 100 assumes, first of all, that all clutches and brakes not specifically referenced in a given gear state are inactive or disengaged and, second of all, that during gear member shifts, i.e., changes of gear state, between at least adjacent gear states, a clutch or brake engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission comprising:
   an input member;
   an output member;
   first, second, third and fourth planetary gear sets each having first, second and third members;
   a first torque transmitting device selectively engageable to interconnect the second member of the fourth planetary gear set and the input member with the first member of the second planetary gear set, the first member of the first planetary gear set, and the second member of the third planetary gear set;
   a second torque transmitting device selectively engageable to interconnect the third member of the second planetary gear set and the second member of the first planetary gear set with the third member of the third planetary gear set and the output member;
   a third torque transmitting device selectively engageable to interconnect the first member of the fourth planetary gear set with the first member of the third planetary gear set;
   a fourth torque transmitting device selectively engageable to interconnect the third member of the first planetary gear with a stationary member; and
   a fifth torque transmitting device selectively engageable to interconnect the first member of the fourth planetary gear set with the stationary member, and
   wherein the torque transmitting devices are selectively engageable in combinations of at least three to establish at least eight forward speed ratios and at least one reverse speed ratio between the input member and the output member.

2. The transmission of claim 1 further comprising a first interconnecting member continuously interconnecting the first member of the first planetary gear set with the first member of the second planetary gear set and the second member of the third planetary gear set.

3. The transmission of claim 2 further comprising a second interconnecting member continuously interconnecting the second member of the first planetary gear set with the third member of the second planetary gear set.

4. The transmission of claim 3 further comprising a third interconnecting member continuously interconnecting the second member of the second planetary gear set with the third member of the fourth planetary gear set.

5. The transmission of claim 1 wherein the first members are sun gears, the second members are carrier members, and the third members are ring gears.

6. The transmission of claim 1 wherein the input member is continuously interconnected with the second member of the fourth planetary gear set and the output member is continuously interconnected with the third member of the third planetary gear set.

7. A transmission comprising:
   an input member;
   an output member;
   first, second, third and fourth planetary gear sets each having a sun gear, a carrier member, and a ring gear, wherein the input member is continuously interconnected with the carrier member of the fourth planetary gear set and the output member is continuously interconnected with the ring gear of the third planetary gear set;
   a first torque transmitting device selectively engageable to interconnect at the carrier member of the fourth planetary gear set and the input member with the sun gear of the second planetary gear set, the sun gear of the first planetary gear set, and the carrier member of the third planetary gear set;
   a second torque transmitting device selectively engageable to interconnect the ring gear of the second planetary gear set and the carrier member of the first planetary gear set with the ring gear of the third planetary gear set and the output member;
   a third torque transmitting device selectively engageable to interconnect the sun gear of the fourth planetary gear set with the sun gear of the third planetary gear set;
   a fourth torque transmitting device selectively engageable to interconnect the ring gear of the first planetary gear with a stationary member; and
   a fifth torque transmitting device selectively engageable to interconnect the sun gear of the fourth planetary gear set with the stationary member, and
   wherein the torque transmitting devices are selectively engageable in combinations of at least three to establish at least eight forward speed ratios and at least one reverse speed ratio between the input member and the output member.

8. The transmission of claim 7 further comprising a first interconnecting member continuously interconnecting the sun gear of the first planetary gear set with the sun gear of the second planetary gear set and the carrier member of the third planetary gear set.

9. The transmission of claim 8 further comprising a second interconnecting member continuously interconnecting the carrier member of the first planetary gear set with the ring gear of the second planetary gear set.

10. The transmission of claim 9 further comprising a third interconnecting member continuously interconnecting the carrier member of the second planetary gear set with the ring gear of the fourth planetary gear set.

11. A transmission comprising:
    an input member;
    an output member;
    first, second, third and fourth planetary gear sets each having first, second and third members;
    a first torque transmitting device selectively engageable to interconnect the second member of the fourth planetary gear set and the input member with the first member of the second planetary gear set, the first member of the first planetary gear set, and the second member of the third planetary gear set;

a second torque transmitting device selectively engageable to interconnect the first member of the fourth planetary gear set with the first member of the third planetary gear set;

a third torque transmitting device selectively engageable to interconnect the third member of the second planetary gear set and the second member of the first planetary gear set with the first member of the third planetary gear set;

a fourth torque transmitting device selectively engageable to interconnect the third member of the first planetary gear with a stationary member; and a fifth torque transmitting device selectively engageable to interconnect the first member of the fourth planetary gear set with the stationary member, and wherein the torque transmitting devices are selectively engageable in combinations of at least three to establish at least eight forward speed ratios and at least one reverse speed ratio between the input member and the output member.

12. The transmission of claim 11 further comprising a first interconnecting member continuously interconnecting the first member of the first planetary gear set with the first member of the second planetary gear set and the second member of the third planetary gear set.

13. The transmission of claim 12 further comprising a second interconnecting member continuously interconnecting the second member of the first planetary gear set with the third member of the second planetary gear set.

14. The transmission of claim 13 further comprising a third interconnecting member continuously interconnecting the second member of the second planetary gear set with the third member of the fourth planetary gear set.

15. The transmission of claim 11 wherein the first member of the first planetary gear set is a carrier member, the second member of the first planetary gear set is a ring gear, the third member of the first planetary gear set is a sun gear, the first member of the second planetary gear set is a ring gear, the second member of the second planetary gear set is a sun gear, the third member of the second planetary gear set is a carrier member, the first member of the third planetary gear set is a ring gear, the second member of the third planetary gear set is a sun gear, the third member of the third planetary gear set is a carrier member, the first member of the fourth planetary gear set is a ring gear, the second member of the fourth planetary gear set is a carrier member, and the third member of the fourth planetary gear set is a sun gear.

16. A transmission comprising:
an input member;
an output member;
first, second, third and fourth planetary gear sets each having a sun gear, a carrier member, and a ring gear, wherein the input member is continuously interconnected with the carrier member of the fourth planetary gear set and the output member is continuously interconnected with the carrier member of the third planetary gear set;

a first torque transmitting device selectively engageable to interconnect the carrier member of the fourth planetary gear set and the input member with the ring gear of the second planetary gear set, the carrier member of the first planetary gear set, and the sun gear of the third planetary gear set;

a second torque transmitting device selectively engageable to interconnect the ring gear of the fourth planetary gear set with the ring gear of the third planetary gear set;

a third torque transmitting device selectively engageable to interconnect the carrier member of the second planetary gear set and the ring gear of the first planetary gear set with the ring gear of the third planetary gear set;

a fourth torque transmitting device selectively engageable to interconnect the sun gear of the first planetary gear with a stationary member; and a fifth torque transmitting device selectively engageable to interconnect the ring gear of the fourth planetary gear set with the stationary member, and wherein the torque transmitting devices are selectively engageable in combinations of at least three to establish at least eight forward speed ratios and at least one reverse speed ratio between the input member and the output member.

17. The transmission of claim 16 further comprising a first interconnecting member, continuously interconnecting the sun gear of the first planetary gear set with the sun gear of the second planetary gear set and the carrier member of the third planetary gear set.

18. The transmission of claim 17 further comprising a second interconnecting member continuously interconnecting the carrier member of the first planetary gear set with the ring gear of the second planetary gear set.

19. The transmission of claim 18 further comprising a third interconnecting member continuously interconnecting the carrier member of the second planetary gear set with the ring gear of the fourth planetary gear set.

* * * * *